United States Patent [19]

Bumueller

[11] Patent Number: 4,962,966
[45] Date of Patent: Oct. 16, 1990

[54] AUTOMATIC TAILGATE ASSEMBLY

[76] Inventor: Hermann K. Bumueller, 229 Westgate, Rosemere, Quebec, Canada, J7A 2E8

[21] Appl. No.: 430,111

[22] Filed: Nov. 1, 1989

[30] Foreign Application Priority Data

Sept. 29, 1989 [CA] Canada ..............................615,325

[51] Int. Cl.$^5$ ................................................ B60P 1/00
[52] U.S. Cl. .................... 298/23 R; 298/1 B
[58] Field of Search ............... 298/23 R, 23 MD, 1 B, 298/12, 14; 296/184

[56] References Cited

U.S. PATENT DOCUMENTS

| | | | |
|---|---|---|---|
| 2,663,439 | 12/1953 | Phelps | 298/1 B |
| 3,827,753 | 8/1974 | Pitts | 298/1 B |
| 4,111,485 | 9/1978 | Martin et al. | 298/1 B |
| 4,260,317 | 4/1981 | Martin et al. | 414/522 X |
| 4,384,816 | 5/1983 | Martin et al. | 298/1 B X |

FOREIGN PATENT DOCUMENTS 969583  6/1975  Canada .

Primary Examiner—Robert J. Spar
Assistant Examiner—William M. Hienz
Attorney, Agent, or Firm—Samuel Meerkreebs

[57] ABSTRACT

In a tailgate assembly for a dump box of the type comprising a front inner section and a rear outer section adapted for telescopic movement one with respect to the other with the inner section slidably engaging an interior surface of the outer section. The relative position of the inner and outer sections between an expanded and a collapsed position thereof is controlled by hydraulic cylinders. The tailgate assembly comprises a tailgate hingedly mounted to the rear of the outer section. A push rod has a front end thereof fixedly mounted at a front side of the inner section of the dump box. The push rod extends rearwards from its front end through a guide mounted on a sidewall of the outer section and towards the tailgate. A chain assembly connects a lower free end of the tailgate with a rear end of the push rod. The chain assembly is adapted to be in a substantially extended position thereof when the dump box is in its expanded position. Therefore, upon collapsing of the dump box, slack will be provided to the chain assembly thereby allowing the tailgate to pivot gradually towards a fully open position thereof. As the cylinders are thus actuated, the inner section of the dump box displaces accordingly which results in a corresponding movement of the push rod and therefore of the tailgate with respect to the rear opening of the dump box.

10 Claims, 2 Drawing Sheets

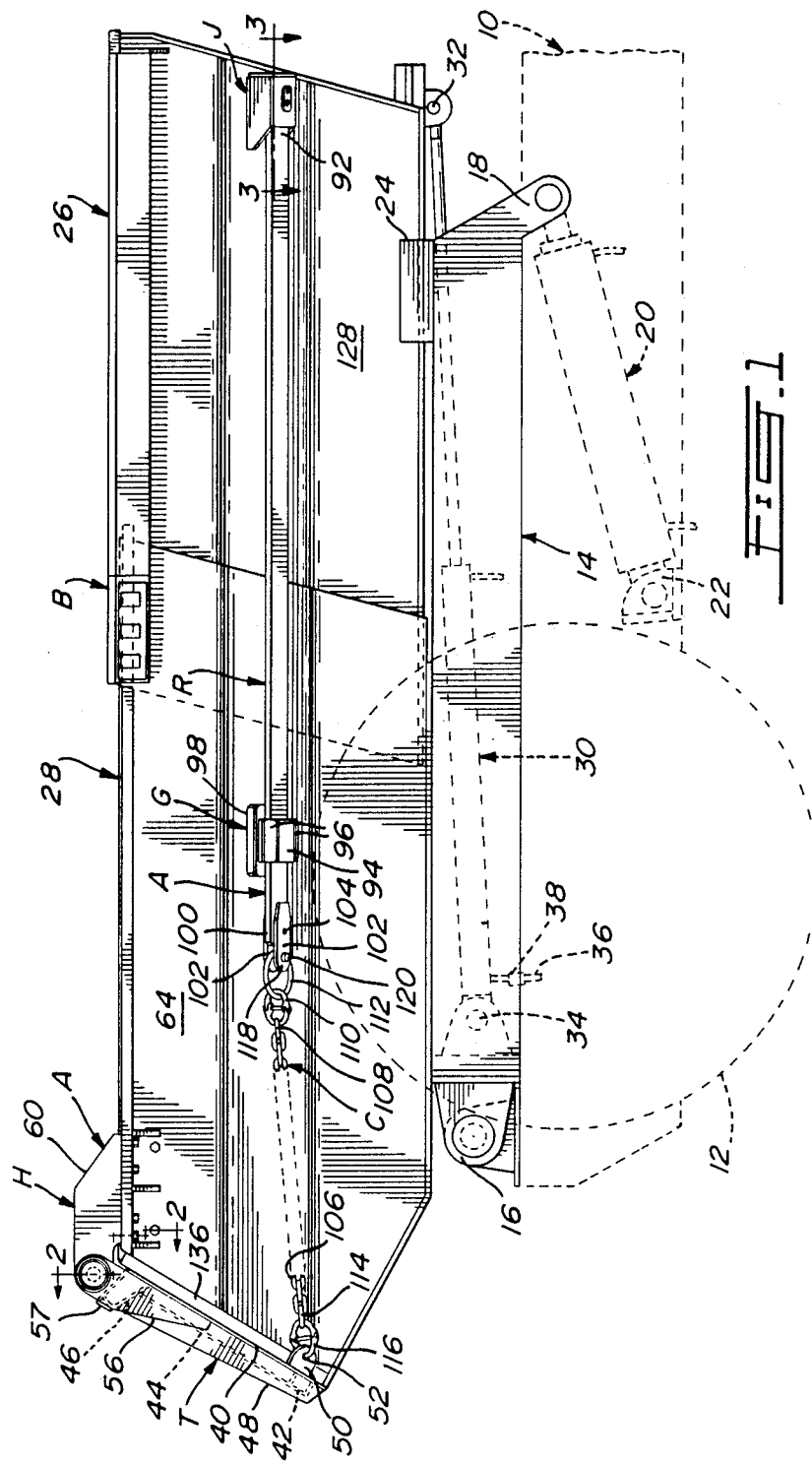

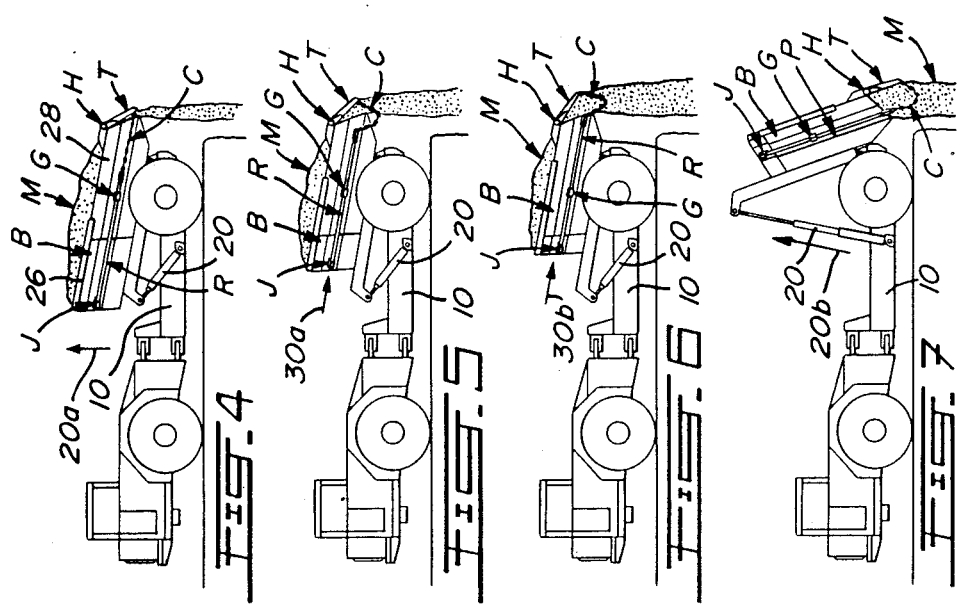
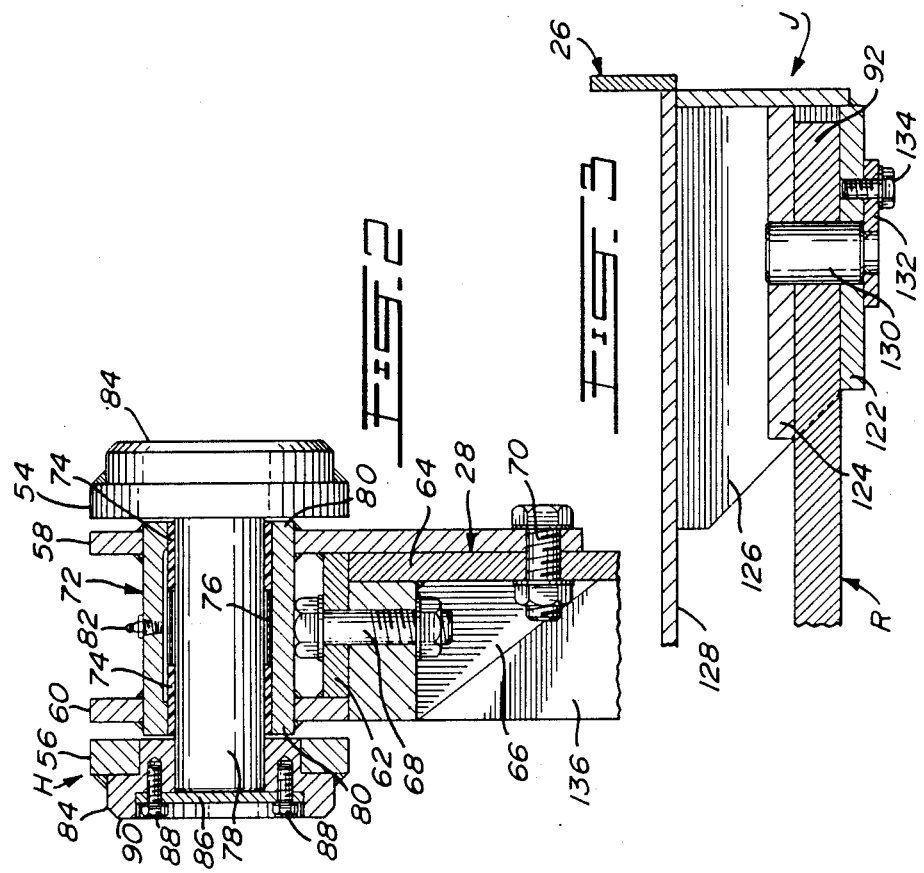

1

AUTOMATIC TAILGATE ASSEMBLY

BACKGROUND OF THE INVENTION

1. Field of the Invention

The present invention relates to tailgates for dump boxes and, more particularly, to an automatic tailgate for a telescopic dump box.

2. Description of the Prior Art

Applicant's Canadian Patent No. 969,583 discloses a two-stage, telescoping dump box for a truck which allows the truck to dump its large load in considerably lower heights than achievable by any other end-dump trucks of similar size available on the market. To achieve this, the dump box comprises two telescoping sections consisting of a front inner section and of a rear outer section. The inner section is adapted to slidably engage an interior surface of the outer section. Hydraulic cylinders are provided between the sections to move the front section relative to the rear section thereby increasing or decreasing the load receiving volume of the dump box. This design further allows easy loading of the dump box on its full length even in areas where the dump box is restricted to end-loading.

The dump box disclosed in the above-mentioned Canadian Patent besides being open-ended at the top thereof is basically also open-ended at its rear to allow easy end-loading of the dump box.

SUMMARY OF THE INVENTION

It is therefore an aim of the present invention to provide a tailgate assembly for a dump box of the type comprising at least two telescoping sections.

It is also an aim of the present invention to provide a tailgate assembly for such a telescopic dump box that will allow the haulage of a greater payload while minimizing spillage of backfill onto the roadway.

It is still a further aim of the present invention to provide a tailgate assembly which is automatically opened and closed as the telescoping sections of the dump box substantially collapse and expand, respectively.

A construction in accordance with the present invention comprises a tailgate assembly for a dump box of the type comprising at least a first front section and a second rear section adapted for telescopic movement one with respect to the other. The telescopic movement which is controlled by motor means ranges between an expanded and a collapsed position of the first and second sections. The dump box is adapted to pivot between a lowered and a raised position thereof. The tailgate assembly comprises at least a tailgate means and a tailgate operating means. The tailgate means includes a tailgate adapted to be hingedly mounted to a rear end part of the second section of the dump box in order to pivot between an open and a closed position thereof with respect to the dump box. The tailgate operating means is adapted to be connected at front and rear ends thereof respectively to a front end part of the first section of the dump box and to the tailgate. The tailgate operating means is further adapted to allow the tailgate to pivot between its open and closed positions a limited angle dependent on a relative position of the first and second sections between the collapsed and expanded positions thereof.

In a further aspect in accordance with the present invention, the tailgate operating means comprises an elongated push rod fixedly mounted at a front end thereof to a front end part of a sidewall of the first section of the dump box. The push rod extends rearwards and parallel to the telescopic movement of the first and second sections. A chain means is mounted at a front end thereof to a rear end of the push rod and at a rear end thereof to a lower side section of the tailgate. The push rod is slidable in a guide means fixedly mounted to a sidewall of the second section intermediate the front and rear ends of the push rod. The guide means is adapted to be close to and in front of the rear end of the push rod when the first and second sections are in the expanded position thereof. The guide means is further adapted to be close to and rearwards of the front end of the push rod when the first and second sections are in the collapsed position thereof. The chain is thus extended in the expanded position to maintain the tailgate in the closed position thereof. Gradual collapsing of the first and second sections will therefore force the push rod rearwards within the guide means towards the tailgate thereby providing slack to the chain means to allow the tailgate to gradually pivot outwards towards the open position thereof further in view of forces applied thereon by material being dumped from the dump box.

In a still further aspect of the present invention, two similar tailgate operating means are mounted on each side of the dump box.

BRIEF DESCRIPTION OF THE DRAWINGS

Having thus generally described the nature of the invention, reference will now be made to the accompanying drawings, showing by way of illustration only a preferred embodiment thereof, and wherein:

FIG. 1 is a side elevation of a telescopic dump box incorporating a tailgate assembly in accordance with the present invention;

FIG. 2 is a cross-sectional view taken along lines 2—2 of FIG. 1 illustrating a hinge of the tailgate assembly of FIG. 1;

FIG. 3 is a cross-section view taken along lines 3—3 of FIG. 1 showing a pinned joint adapted to fixedly mount the front end of the push rod of the tailgate assembly of FIG. 1 to the front side of the dump box; and FIGS. 4 to 7 are schematic side views of a truck incorporating the dump box and the tailgate assembly of FIG. 1 which illustrate the behavior of the tailgate through a sequence of dumping operations.

DESCRIPTION OF THE PREFERRED EMBODIMENTS

Now referring mainly to FIG. 1, a tailgate assembly A in accordance with the present invention is mounted to a telescopic dump box B. Before detailing the structure of the tailgate assembly A, a structural and operational description of the telescopic dump box B will be given hereinbelow.

The dump box B is basically mounted onto a bed frame 10 of a truck which is not fully shown. Wheels 12 are mounted to the bed frame 10. The dump box B is mounted to a dump box bed 14 which is pivotally mounted at a first end 16 thereof to the bed frame 10. The dump box bed 14 is pivotally joined at a second end 18 thereof to a pair of dumping cylinders 20. The dumping cylinders 20 are each pivotally mounted at its opposed end 22 to the bed frame 10. Normally the two dumping cylinders 20 are mounted one on each underside of the dump box B. The dumping cylinders 20 are preferably hydraulic cylinders. A pair of side guide brackets 24 are fixedly mounted to each sides of the second end 18 of the dump box bed 14.

The dump box B comprises an inner front section 26 and an outer rear section 28 which are adapted for telescopic movement one with respect to the other. The inner section 26 which is slidably guided and supported by the guide brackets 24 engages an interior surface of the outer section 28. A pair of extension cylinders 30 which are also preferably hydraulic are disposed under the dump box B for moving the inner and rear sections 26 and 28 between an expanded and a collapsed position thereof. The extension cylinders 30 are mounted at both ends 32 and 34 thereof respectively to a front underside of the dump box B and to the first end 16 of the dump box bed 14. Input hoses 36 of the extension cylinders 30 are each fitted with a relief valve 38, the purpose of which will be given hereinafter.

Proper operation of the dumping cylinders 20 and of the extension cylinders 30 will allow a load contained in the dump box B to be dumped therefrom within a minimal vertical clearance, as generally shown in FIGS. 4 to 7.

Having generally described the dump box B and the operation thereof, description of the structure and operation of the tailgate assembly A will now be given as remaining details of the telescopic dump box B, such as the guide system for the sections 26 and 28 thereof, are already well known as having been disclosed in aforementioned Canadian Patent No. 969,583. Understanding of the principle of the dump box B as basically shown in FIGS. 4 to 7 is sufficient to proceed with the description of the tailgate assembly A adapted thereto.

The tailgate assembly A generally comprises the following components: a tailgate T, a pair of hinges H for the tailgate T, pairs of chain assemblies C, push rods R, rear guides G and pinned joints J. Of the previous components, those that come in pairs comprise two similar components, one on each side of the dump box B.

The tailgate T is a heavy gauge roughly rectangular shape panel having a back plate 40 and a plurality of reinforcement horizontal and vertical channels 42 and 44 respectively welded thereon. The tailgate T further comprises a runner 46 mounted horizontally at a top end portion thereof as well as side plates 48 extending outwards from opposed parallel side edges of the back plate 40. Lugs 50 extend outwards from inner lower corners of the back plate 40. A hole 52 is defined in each of the lugs 50.

Now referring to FIGS. 1 and 2, each hinge H comprises inner and outer ribs 54 and 56 respectively which are partly welded to the tailgate T and joined at their top edges by a plate 57. Inner and outer brackets 58 and 60 of the hinge H are fixedly mounted to a rear part of the outer section 28 of the dump box B on each side of a top flange 62 and a sidewall 64 thereof. A series of gussets 66 are provided as reinforcements. The inner and outer brackets 58 and 60 and the gussets 66 are mounted to the top flange 62 and to the sidewall 64 of the outer section 28 using welds and series of nut and bolt arrangements 68 and 70.

A tubular pin body 72 is welded to the inner and outer brackets 58 and 60 as seen in FIG. 2. A pair of bushings 74 and a tubular spacer 76 are provided intermediate the pin body 72 and a pin 78 which extends longitudinally therethrough and past opposed annular free edges 80 thereof. The pin body 72 further comprises a grease nipple 82.

Pin bosses 84 are welded to the outer surfaces of both the inner and outer ribs 54 and 56, as seen in FIG. 2. Caps 86 are mounted by bolts 88 into circular cavities defined in outer surfaces 90 of the pin bosses 84.

It is easily seen from FIGS. 1 and 2 that a pivot of the tailgate T causes the inner and outer ribs 44 and 46 to pivot thereby causing rotation of the pin bosses 84 and of the pin 78 within the bushing 74 of the pin body 72 of the inner and outer brackets 58 and 60.

The push rod R is fixedly mounted at a front end 92 thereof to the pinned joint J which will be described hereinbelow. The push rod R is slidable in the rear guide G which consists of a sleeve 94 made of a series of welded plates 96 defining a rectangular shape opening therethrough for the push rod R. The sleeve 94 has a base plate 98 which is bolted and welded to the sidewall 64 of the second section 28 of the dump box B.

A rear end 100 of the push rod R comprises a pair of spaced apart yoke side plates 102 extending rearwards therefrom. The yoke side plates 102 are fixed to the rear end 100 of the push rod R both by way of a dowel pin 104, and welds.

The chain assembly C comprises an alloy chain 106 including at a front extremity 108 thereof a front alloy coupling link 110 and a weldless end link 112, in succession. The alloy chain 106 further comprises at a rear extremity 114 thereof a rear alloy coupling link 116. The rear coupling link 116 is engaged in the hole 52 of the lug 50 of the tailgate T on one side thereof and on another side thereof with the rear extremity 114 of the chain 106. The front coupling link 110 is engaged with the front extremity 108 of the chain 106 and with the weldless end link 112. The weldless end link 112 is further engaged between free ends 118 of the yoke side plates 102 by an arrangement 120 which includes a pin, a flat washer and a cotter pin with the pin extending through the yoke side plates 102.

Now referring to FIG. 3, description will be given of the connection of the front end 92 of the push rod R to the pinned joint J. Top and bottom plates 122 and 124 and a pair of side plates 126 are welded together to form a sleeve into which the front end 92 of the push rod R can be inserted. The side plates 126 extend inwards of the sleeve and are welded to a sidewall 128 of the inner section 26 of the dump box B in order to secure the pinned joint J thereto. A pin 130 is positioned in aligned holes defined in both the top and bottom plates 122 and 124 and the front end 92 of the push rod R, as seen in FIG. 3. The pin 130 is maintained in engagement with the top and bottom plates 122 and 124 and thus with the push rod R by way of a retainer 132 bolted to the top plate 122 by way of a bolt 134.

It is easily seen from FIG. 1 that upon collapsing of the inner section 26 of the dump box B in the outer section 28 thereof upon actuation of the extension cylinders 30, the push rod R will follow the longitudinal movement of the inner section 26 and thus slide through the rear guide G. Such a corresponding displacement of the push rod R is ensured by its connection to the pinned joint J. Rearward displacement of the push rod R will provide slack in the chain assembly C thereby allowing the tailgate T to pivot about the hinges H towards an open position thereof, whereby material M contained in the dump box B will be dumped therefrom in a sequence such as the one illustrated in FIGS. 4 to 7.

In FIG. 4, the inner and outer sections 26 and 28 are slightly telescoped to provide a slack in the chain assembly C. This allows the tailgate T to pivot towards a slightly open position in order to allow the material M contained in the dump box B to escape therefrom as the latter is slowly being raised by the action of the hydraulic dumping cylinders 20.

Now referring to FIG. 5, collapsing of the inner section 26 provides the chain assembly C with a considerable slack which allows the tailgate T to open accordingly. FIG. 6 illustrates the dump box B in a completely collapsed position thereof, whereas FIG. 7 shows the same as well as the dump box B in a completely raised position.

The sequence illustrated in FIGS. 4 to 7 results from a controlled operation of both the dumping cylinders 20 and the extension cylinders 30, as indicated by arrows 20a and 20b, and 30a and 30b, respectively. A single control valve can be used for controlling the dumping and extension procedures simultaneously with a single lever.

Relief valves 38 are provided on the input hoses 36 of the extension cylinders 30 to interrupt the extension of the extension cylinders 30 and therefore the expansion of the dump box B when material is lodged between the tailgate T and rear side and lower flanges 136 of the outer section 28 of the dump box B. This prevents overloading of either the extension cylinders 30 or of the combination of the push rod R with the chain assembly C and the pin joint J or, more probably, distortion of the tailgate T. It also ensures that the tailgate T is firmly closed.

It is easily seen from the foregoing that the above-described tailgate assembly is perfectly suited for the telescopic dump box disclosed in Canadian Patent No. 969,583. The tailgate assembly is of simple and sturdy construction and is automatically operated by the extension cylinders which dictate the telescopic position of the telescopic dump box. The tailgate assembly allows haulage of a greater payload while minimizing spillage of backfill onto the roadway.

I claim:

1. A tailgate assembly for a dump box of the type comprising at least a first front section and a second rear section adapted for telescopic movement one with respect to the other between an expanded and a collapsed position thereof, motor means being provided for controlling the telescopic movement, the dump box being adapted for pivoting between a lowered and a raised position thereof; said tailgate assembly comprising at least a tailgate means and a tailgate operating means, said tailgate means including a tailgate adapted to be hingedly mounted to a rear end part of the second section of the dump box for pivoting between an open and a closed position thereof with respect to the dump box, said tailgate operating means being adapted for connection at front and rear ends thereof respectively to the first section of the dump box and to said tailgate, said tailgate operating means being adapted for allowing said tailgate to pivot between said open and closed positions thereof a limited angle dependent on a relative position of the first and second sections.

2. A tailgate assembly for a dump box as defined in claim 1, wherein the first and second sections are respectively inner and outer sections, the inner section slidably engaging an interior surface of the outer section.

3. A tailgate assembly for a dump box as defined in claim 2, wherein hinge means are provided for mounting said tailgate to the rear end part of the outer section of the dump box, whereby said tailgate pivots about a top end thereof.

4. A tailgate assembly for a dump box as defined in claim 2, wherein hinges are adapted to be mounted to rear top end surfaces of each sidewall of the outer section and to respective side portions of an outer surface of said tailgate, whereby said tailgate pivots about a top end thereof.

5. A tailgate assembly for a dump box as defined in claim 3, wherein said tailgate operating means comprises an elongated push rod fixedly mounted at a front end thereof to a front end part of a sidewall of the inner section, and extending rearwards parallel to the direction of telescopic movement of the inner and outer sections, a chain means being mounted at a front end thereof to a rear end of said push rod and at a rear end thereof to a lower side section of said tailgate, said push rod being slidable in a guide means fixedly mounted to a sidewall of the outer section intermediate said front and rear ends of said push rod, whereby said guide means is close to and in front of said rear end of said push rod when the inner and outer sections are in the expanded position thereof, whereas said guide means is close to and rearwards of said front end of said push rod when the inner and outer sections are in the collapsed position thereof, wherein said chain is extended in the expanded position for maintaining said tailgate in said closed position thereof, gradual collapsing of the inner and outer sections forcing said push rod rearwards within said guide means towards said tailgate thereby providing slack to said chain means for allowing said tailgate to gradually pivot outwards towards said open position thereof.

6. A tailgate assembly for a dump box as defined in claim 5, wherein a pair of yoke side plates extend rearwards in a spaced apart relationship from said rear end of said push rod, said chain means comprising an alloy chain, a first alloy coupling link being connected to a first link of said chain, said first coupling link being further connected to a weldless end link, said weldless end link being further connected to said rear end of said push rod by a pin extending transversely through said yoke side plates through holes defined therein and which is fixed thereto; a second alloy coupling link being connected to a last link of said chain, said second coupling link being further connected to a lug extending outwards from a lower side inner surface of said tailgate.

7. A tailgate assembly for a dump box as defined in claim 6, wherein two similar tailgate operating means are mounted symmetrically one to the other on each side of the dump box.

8. A tailgate assembly for a dump box as defined in claim 1, wherein said motor means comprises extension cylinders for controlling the relative position of the first and second sections of the dump box, a relief valve being provided on an input hose of each one of the extension cylinders thereby preventing material lodged between said tailgate and the rear end part of the second section from distorting said tailgate as the first and second sections are displaced towards the expanded position thereof.

9. A tailgate assembly for a dump box as defined in claim 5, wherein said front end of said push rod is adapted to fit in a sleeve fixedly mounted to the front end part of the sidewall of the inner section, said front end of said push rod being fixed to said sleeve by a pin engaged in aligned openings defined in said push rod and in sidewalls of said sleeve located on each side of said push rod, a plate being bolted to an outer one of said sidewalls of said sleeve for at least partly covering the opening of said outer one of said sidewalls thereby securing said pin in said openings.

10. A tailgate assembly as defined in claim 1, wherein said tailgate is closed in the expanded position of the first and second sections, and wherein said tailgate opens with a dumping angle ranging between the closed position of said tailgate and a position thereof corresponding to said limited angle, said dumping angle depending in part on forces applied thereon by a load being dumped from the dump box.

* * * * *